US011886461B2

(12) United States Patent
Jagota et al.

(10) Patent No.: US 11,886,461 B2
(45) Date of Patent: Jan. 30, 2024

(54) MACHINE-LEARNT FIELD-SPECIFIC STANDARDIZATION

(71) Applicant: Salesforce, Inc., San Francisco, CA (US)

(72) Inventors: Arun Kumar Jagota, Sunnyvale, CA (US); Stanislav Georgiev, Sunnyvale, CA (US)

(73) Assignee: Salesforce, Inc., San Francisco, CA (US)

( * ) Notice: Subject to any disclaimer, the term of this patent is extended or adjusted under 35 U.S.C. 154(b) by 812 days.

(21) Appl. No.: 16/528,175

(22) Filed: Jul. 31, 2019

(65) Prior Publication Data

US 2021/0034638 A1 Feb. 4, 2021

(51) Int. Cl.
*G06N 20/00* (2019.01)
*G06N 7/01* (2023.01)
*G06F 16/25* (2019.01)
*G06F 16/2455* (2019.01)

(52) U.S. Cl.
CPC ........ *G06F 16/258* (2019.01); *G06F 16/2456* (2019.01); *G06N 7/01* (2023.01); *G06N 20/00* (2019.01)

(58) Field of Classification Search
CPC ........ G06N 20/00; G06N 20/10; G06N 20/20; G06N 7/005; G06N 7/00; G06N 5/00; G06N 5/02; G06N 5/04; G06F 16/258; G06F 16/1794; G06F 16/2456
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |

(Continued)

OTHER PUBLICATIONS

Wu et al. "Learning Data Transformation Rules through Examples: Preliminary Results", 2012 https://dl.acm.org/doi/pdf/10.1145/2331801.2331809 (Year: 2012).*

(Continued)

*Primary Examiner* — Kamran Afshar
*Assistant Examiner* — Shoun J Abraham
(74) *Attorney, Agent, or Firm* — Kwan & Olynick LLP

(57) ABSTRACT

A system tokenizes raw values and corresponding standardized values into raw token sequences and corresponding standardized token sequences. A machine-learning model learns standardization from token insertions and token substitutions that modify the raw token sequences to match the corresponding standardized token sequences. The system tokenizes an input value into an input token sequence. The machine-learning model determines a probability of inserting an insertion token after an insertion markable token in the input token sequence. If the probability of inserting the insertion token satisfies a threshold, the system inserts the insertion token after the insertion markable token in the input token sequence. The machine-learning model determines a probability of substituting a substitution token for a substitutable token in the input token sequence. If the probability of substituting the substitution token satisfies another threshold, the system substitutes the substitution token for the substitutable token in the input token sequence.

20 Claims, 3 Drawing Sheets

(56) References Cited

U.S. PATENT DOCUMENTS

| | | |
|---|---|---|
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,730,478 B2 | 6/2010 | Weissman |
| 7,779,039 B2 | 8/2010 | Weissman et al. |
| 7,779,475 B2 | 8/2010 | Jakobson et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 10,839,156 B1 * | 11/2020 | Saxena ............ G06N 3/0454 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2012/0233137 A1 | 9/2012 | Jakobson et al. |
| 2013/0218948 A1 | 8/2013 | Jakobson |
| 2013/0218949 A1 | 8/2013 | Jakobson |
| 2013/0218966 A1 | 8/2013 | Jakobson |
| 2014/0359537 A1 | 12/2014 | Jakobson et al. |
| 2015/0007050 A1 | 1/2015 | Jakobson et al. |
| 2015/0095162 A1 | 4/2015 | Jakobson et al. |
| 2015/0172563 A1 | 6/2015 | Jakobson et al. |
| 2019/0108257 A1 * | 4/2019 | Lefebure ............ G06F 16/3329 |
| 2020/0356363 A1 * | 11/2020 | Dewitt ................ G06F 8/73 |

OTHER PUBLICATIONS

Gamon et al. "Using Contextual Speller Techniques and Language Modeling for ESL Error Correction" 2008 https://aclanthology.org/I08-1059.pdf (Year: 2008).*

Santos et al. "Syntax and Sensibility: Using Language Models to Detect and Correct Syntax Errors", Mar. 2018 https://ieeexplore.ieee.org/stamp/stamp.jsp?tp=&arnumber=8330219&tag=1 (Year: 2018).*

Goldberg et al. "Address Standardization" 2014 https://www.researchgate.net/profile/John-Wilson_14/publication/307888242_

(56) References Cited

OTHER PUBLICATIONS

Address_standardization/links/57d088e908ae5f03b4891120/Address-standardization.pdf (Year: 2014).*

* cited by examiner

MACHINE-LEARNT FIELD-SPECIFIC STANDARDIZATION

CROSS-REFERENCE TO RELATED APPLICATION

This application is related to commonly owned, co-pending U.S. patent application Ser. No. 16/525,945, filed Jul. 30, 2019, which is incorporated by reference herein in its entirety.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Companies are often overwhelmed with customer data. Examples of customer data fields include a name, a billing address, a shipping address, an email address, and a phone number. Managing customer data may become extremely complex and dynamic due to the many changes that individual customers go through over time. For example, a company's purchasing agent can change her family name upon marriage, change her email address, change her phone number, and change her employer within a relatively short period of time. In another example, a customer who is known by the name Robert can also use Rob, Robby, Bob, and Bobby as his given name. The use of customer data may create additional challenges, such as due to invalid email addresses, invalid phone numbers, invalid street addresses, names spelled wrong, incorrect employer information, and duplicate customer data records with inconsistent information. When these customer data fields are multiplied by the millions of customer data records which a company may have in its data sources, and the frequency of how often this customer data is incorrect or changes is also taken into consideration, the result is that many companies have a significant data management challenge.

Furthermore, the potential for customer data challenges may increase when customer data enters a company's customer data system from the company's multiple data sources. Examples of a company's data sources include the customer data from interactions conducted by the company's marketing, retail, and customer service departments. This customer data may be distributed for storage by different cloud storage providers, and/or these company departments may be organized as different tenants in a multi-tenant database.

A traditional approach to resolving these challenges is through the instantiation of a database system that functions as a master data management hub which stages, profiles, cleanses, enriches, matches, reconciles, and instantiates all customer related records to create a single master profile for each customer, and then provides access to these master profiles and their cross references to business applications. The database system can use the generated master profiles to assist in responding to customer requests. For example, a customer makes a purchase via a company's retail cloud instance, and the customer enters some identifying information when filing a service request with the company's customer service cloud instance. The database system responds by automatically finding all that is known about this customer in their master profile, especially in the purchase record(s) of the relevant item, so as to enable the company's customer service department to process the service request more effectively. A multi-tenant database can create tens of millions of master profiles for each of hundreds of thousands of tenants.

Since these master profiles will be visible to system administrators, data stewards, system users, customers, and/or other individuals, a database needs to carefully standardize the master profiles' content. The standardizations for presenting master profiles content vary not only by record fields, such as first name, last name, phone number, street address, postal code, city, and state, but also vary based on locale, such as by geographic regions and languages. Since many locales have widely differing presentation conventions, locale-specific variations tend to be intricate. Table 1 below depicts examples of scenarios involving standardization of various fields in various locales.

TABLE 1

Field-specific, locale-specific, raw values along with their desired standardizations.

| Field | Locale | Raw Value | Standardized Value | Note |
|---|---|---|---|---|
| first name | all | j | J. | If first name is one letter, upper case the letter and insert a period after the upper-cased letter. |
| first name | English | john-van | John-Van | |
| country | all | United States | US | Standardize to two-letter ISO code |
| phone number | US | (123) 456 7890 | 123-456-7890 | |
| street address | US | Two Mary drive, # 26 | 2 Mary Dr, #26 | |
| street address | BE | 6 rue du comet | Rue du Comet 6 | Street number is after street name |
| city | US | South san Francisco | S. San Francisco | |
| email | all | JSMITH@xyz.com | jsmith@xyz.com | |
| state | US | California | CA | |

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Figure 1:
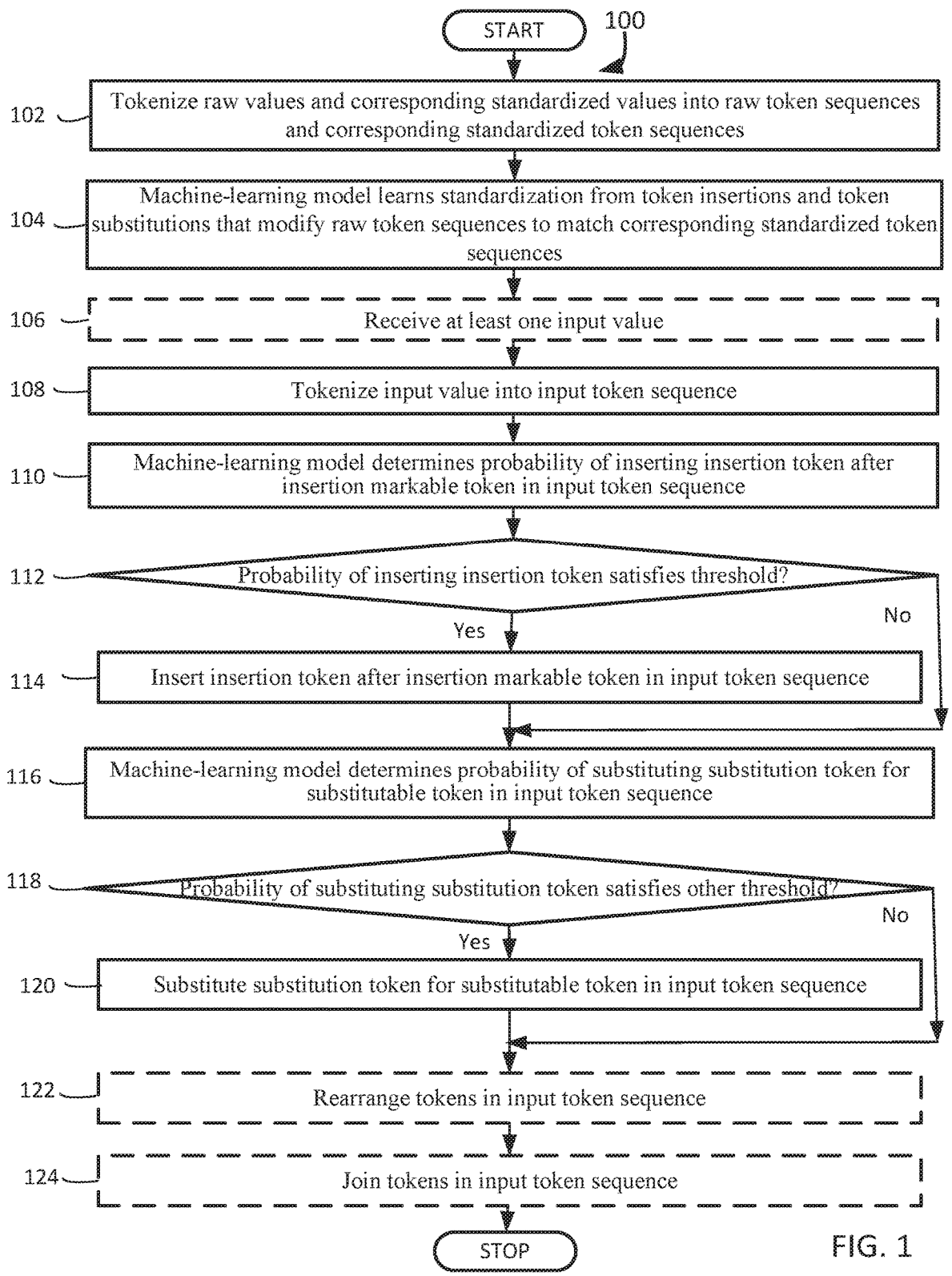
FIG. 1 is an operational flow diagram illustrating a high-level overview of a method for machine-learnt field-specific standardization, in an embodiment.

In accordance with embodiments described herein, there are provided methods and systems for machine-learnt field-specific standardization. A system tokenizes raw values and corresponding standardized values into raw token sequences and corresponding standardized token sequences. A machine-learning model learns standardization from token insertions and token substitutions that modify the raw token sequences to match the corresponding standardized token sequences. The system tokenizes an input value into an input token sequence. The machine-learning model determines a probability of inserting an insertion token after an insertion markable token in the input token sequence. If the probability of inserting the insertion token satisfies a threshold, the system inserts the insertion token after the insertion markable token in the input token sequence. The machine-learning model determines a probability of substituting a substitution token for a substitutable token in the input token sequence. If the probability of substituting the substitution token satisfies another threshold, the system substitutes the substitution token for the substitutable token in the input token sequence.

For example, a machine-learning framework tokenizes the raw values that include "(123)4567890" and their standardized values that include "123-456-7890" into the raw token sequences that include "(, 123,), 456, 7890" and their aligned standardized token sequences that include "123, -, 456, -, 7890". A machine-learning model learns standardization, which includes the insertions of hyphen tokens and the substitutions of nil tokens for parentheses tokens that modifies the raw token sequence "(, 123,), 456, 7890" to match the standardized token sequence "123, -, 456, -, 7890". A customer resolution engine receives input values that include "(987)6543210" and tokenizes the input values into an input token sequence that includes "(, 987,), 654, 3210". The machine-learning model calculates a 99% probability that hyphen tokens should be inserted after the third digit token and the sixth digit token in "(, 987,), 654, 3210". Since the 99% probability of inserting these hyphen tokens is greater than the 50% insertion threshold, the customer resolution engine inserts the hyphen tokens after the third digit token and the sixth digit token to modify the input token sequence to include "(, 987, -,), 654, -, 3210". The machine-learning model calculates a 98% probability that nil tokens should be substituted for the parentheses tokens in the "(, 987, -,), 654, -, 3210". Since the 98% probability of substituting nil tokens for the parentheses tokens is greater than the 49% substitution threshold, the customer resolution engine substitutes nil tokens for the parentheses tokens to modify the input token sequence to include "987, -, 654, -, 3210", which the customer resolution engine joins to become "987-654-3210", which is the standardized version of the US phone number fields in a master profile.

Systems and methods are provided for machine-learnt field-specific standardization. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system. The following detailed description will first describe a method for machine-learnt field-specific standardization. Next, systems for machine-learnt field-specific standardization will be described with reference to example embodiments.

While one or more implementations and techniques are described with reference to an embodiment in which machine-learnt field-specific standardization is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the embodiments described herein may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

The process of standardizing a value of a given field may be modeled as a process of applying the following chain of operations on the value. value.tokenize(f).insert_delete_tokens(f).substitute_tokens_(f).rearrange(f).join(f) where f denotes a particular field. In the following examples from Table 1 above, operations that have no effect are not depicted.

[j]→tokenize→[j]→add period→[j, .]→upper case j→[J, .]→join→[J.]

[john-van]→tokenize→[john, -, van]→capitalize words→[John, -, Van]→join→[John-Van]

[JSMITH@xyz.com]→tokenize→[JSMITH, @, xyz, ., com]→down-case words→[jsmith, @, xyz, ., com]→join→[jsmith@xyz.com]

[South san Francisco]→tokenize→[South, san, Francisco]→abbreviate South, capitalize san→[S., San, Francisco]→join→[S. San Francisco]

[(123) 456 7890]→tokenize→[(, 123,), 456, 7890]→insert the hyphens→[(, 123, -,), 456, -, 7890]→delete the "(" and the ")" tokens→[123, -, 456, -, 7890]→join→[123-456-7890]

The chain of operations listed above implicitly contains various learnable elements which may be learned from a combination of domain knowledge and field-specific supervised training sets. This approach is not realizable by using machine learning algorithms available in the public domain.

A field-specific training set is a collection of tuples of the form (locale, raw_value, standardized_value), such as the examples in Table 1. Although the machine-learning model may learn from the locale element, the following descriptions focus on the machine-learning of learnable elements in the insert_delete_tokens(f) and the substitute_tokens(f) phases, which involves the insertions, deletions, and substitutions of tokens. Substitution of tokens may also be known as standardization.

The extraction of certain features from the pair of token sequences (raw_value, standardized_value) assists the machine-learning process. This process is similar to feature engineering in usual machine-learning, only more intricate in its details. The machine-learning process is described below:

Tokenize each of raw_value and standardized_value to create token sequences.

Execute a black-box algorithm to align these two token sequences.

Use this aligned pair of token sequences to suitably adapt the insertion, deletion, and substitution token-level models.

The alignment of token sequences creates a sequence of aligned pairs of token sequences. An aligned pair of token sequences is one of three types: nil→standardized-token, raw-token→nil, and raw-token→standardized-token. The nil→standardized-token alignment asserts that a standardized-token should be inserted in a certain context. The raw-token→nil alignment asserts that a raw-token should be deleted in a certain context. The raw-token→standardized-token alignment asserts that a raw-token should be replaced by a standardized-token in a certain context. In each case, the context is captured by the aligned pairs in the proximity of this one. For example,

| One market Street | ( 123 )     | 456 nil 7890 |
| 1 Market St       | nil 123 nil | 456 - 7890   |

The first aligned pair of token sequences has three substitutions. The second aligned pair of token sequences has two deletions, of '(' and ')', respectively. The third aligned pair of token sequences has one insertion, of a hyphen.

The following example alignments of the example values in Table 1 above illustrate the concept of alignments.

(123) 456 7890→(123) " " 456 " " 7890

123-456-7890→nil 123 nil-456-7890

JSMITH@xyz.com→JSMITH @ xyz.com jsmith @ xyz.com→jsmith @ xyz.com

South san Francisco→South san Francisco

S. San Francisco→S. San Francisco john-van→john-van

John-Van→John-Van

The following notation is used to describe the machine-learning algorithm formally. R and S denote the tokenized versions of the raw sequence and the standardized sequence in a (raw value, standardized value) pair, respectively. (R', S')=(r'$_1$→s'$_1$), . . . , (r'$_n$→s'$_n$) denotes an alignment of R and S. As described above, this alignment includes three types of aligned pairs of token sequences: nil→s$_i$, r$_i$→nil, and r$_i$→s$_j$ where nil→s$_i$ denotes a contextual insertion in s$_i$ relative to R, r$_i$→nil denotes a contextual deletion in s$_i$ relative to R, and r$_i$→s$_i$ denotes a contextual substitution of token r$_i$ from R by token s$_i$ in S.

The machine-learning algorithm learns two types of cases: (1) insertions and (2) substitutions and deletions. The machine-learning algorithm learns substitutions and deletions together as one type of case because of the following. In an alignment (R', S'), an aligned pair of token sequences which involves a substitution has the form r$_i$→s$_i$. Since s$_i$ may also be nil, r$_i$→s$_i$ may be r$_i$→nil, which may be read as "replace r$_i$ by 'nothing,' or delete r$_i$." Consequently, the term "substitution" may be used to describe both a standard substitution and a "deletion" substitution.

A machine-learning model is able to learn to replace r$_i$ by s$_1$ from a collection of instances of this type, or more formally:

$$P(S_i|R) \qquad \text{Equation (1)}$$

where S$_i$ is a suitable universe of possible replacements of r$_i$. Equation (1) is conditioned on the entire token sequence R, not conditioned only on r$_i$.

From such a machine-learning model, s may be defined to be that replacement among the candidates which has the highest posterior probability.

$$\arg\max_s P(S_i|R) \qquad \text{Equation (2)}$$

In a simplified version of Equation (1), the replacement of r$_i$ is allowed to be influenced only by r$_i$.

$$P(S_i|r_i) \qquad \text{Equation (3)}$$

Broadly speaking, there are two types of substitutions—substitutions for which a dictionary-based approach works, and substitutions for which a dictionary-based approach does not work. The following are some examples of substitutions for which a dictionary-based approach works.

Du→du //In the street name field

One→1 //In the street number field

South→S //In the city field

The following are some examples of substitutions for which a dictionary-based approach does not work.

john→John /In the first name field

JSMITH→jsmith //In the email prefix field

The machine-learning algorithm described below covers both types of approaches. The following universe of operations are defined on the down-cased version of r$_i$, which may be referred to as r$_i$'.

Operation A: Capitalize only the first letter of r$_i$'.

Operation B: Use r$_i$', the down-cased version of r$_i$.

Operation C: Replace r$_i$' by S$_j$'.

Down-casing r$_i$ reduces the complexity of the problem, allowing better generalization from a small training set. However, when the cases of characters in r$_i$ can influence its standardization, r$_i$ is not down-cased. To cover such situations, r$_i$' is replaced in Operation C by r$_i$.

The universe of tokens is defined on which an operation is applicable:

Universe A: All possible r$_i$ in which the first letter is in lower case.

Universe B: All possible r$_i$ in which at least one letter is in upper case.

Universe C will be defined later.

These universes enable the definition of the probability that executing the associated operation will be a success that yields the desired standardization. The probability for Universe A is denoted as P$_A$ and the probability for Universe B is denoted as P$_B$. The probability model for Operation C is defined as:

$$P_C(s|r) \qquad \text{Equation (4)}$$

where r is a specific raw token. Equation (4) may be read as "the probability that replacing r by S will yield the desired standardization."

The training set for the machine-learning model of Equation (3) is a collection of (r, s) pairs where r is the raw token and S is the standardized token. Such a training set may be extracted from a set {(R', S')} of alignments of token sequences. The estimates for the various probability models are obtained from the training set.

The standardization john→John is used as an illustrative example.

The counter of Universe A's sample space is incremented by 1 because the first letter of john is in lower case. The counter of Operation A is incremented by 1 because this instance is in Universe A's sample space and the standardized version differs from the raw version in that the first letter is capitalized.

The counter of Universe B's sample space is not incremented because all the letters in john are already in lower case. Consequently, Operation B's counter is not incremented either.

The counter of Universe C's sample space for john is incremented by 1. This counter ultimately counts the number of training set instances in which $r_i$ equals john. The counter of Operation C is incremented by 1 because john is standardized to John.

The following example illustrates a situation in which the replacement depends on the context.

123 South Broadway Ave.→123 S. Broadway Ave. Example (1)

123 South St.→123 South St. Example (2)

In Example (1), South is a directional qualifier that is replaced by S. In Example (2), since South is the street name, South remains unchanged.

For Equation 1, the probability $P(S_i=s|R)$ needs to denote that the potential replacement s of token $r_i$ in the context of the full sequence R of tokens is correct. The most likely replacement of $r_i$ is then the replacement that maximizes this probability, as depicted in Equation (2).

Example (1) and Example (2) suggest that $P(S_i=s|R)$ should be generalized further. Specifically, South is replaced by S. if and only if the token following South is not a street keyword, such as Avenue, Ave, St, Street, etc, To accommodate this address generalization in the modeling, Equation (1) is generalized as follows:

$$P(S_i|f_i(R)) \quad \text{Equation (5)}$$

where $f_i(R)$ denotes a vector of features extracted from R in the context of token $r_i$. The context of $r_i$ is needed because the extracted features are likely to be from tokens in the proximity of $r_i$.

The feature $f_i(R)=(r_i, n_i)$ works for the desired standardizations of South in Example (1) and Example (2), where $n_i$ is the number of words to the right of $r_i$ that need to skipped before encountering a street keyword. This distance is infinity if there is no street keyword to the right of $r_i$ and this distance is negative if the street keyword appears to the left of $r_i$. The feature vectors of the word South in Example (1) is (South, 1) and Example (2) is (South, 0). The token South that corresponds to (South, 1) is standardized to S. and the token South that corresponds to (South, 0) remains unchanged as South. If there is one word between South and the street keyword, then South is probably a directional qualifier. If the street keyword immediately follows the word South, then South is a part of the street name.

The following examples taken from Table 1 illustrate insertions.

j→J. Example (3)

123 456 7890→123-456-7890 Example (4)

Example (3) involves inserting a period, and Example (4) involves inserting hyphens. Since insertions need the context by definition, insertions are modeled the same way that contextual substitutions are modeled.

$$P(S_i|f_i(R)) \quad \text{Equation (6)}$$

The form of Equation (6) is identical to the form of Equation (5), but the interpretation and semantics differ, in that the probability is calculated that inserting $S_i$ immediately after token $r_i$ is the correct standardization. $S_i$ is a random variable whose values are specific tokens. $S_i$=nil denotes no insertion, which is necessary for Equation (6) to be meaningfully defined.

When applying Equation (6) to Example (3), there is just one binary-valued feature, which has a value of 1 if R is a single token comprised of a single character and a value of 0 if R is not a single token comprised of a single character. When applying Equation (6) to Example (4), there is just one binary-valued feature, which has a value of 1 if the current token and the next token are comprised only of digits and has a value of 0 if the current token and the next token are not comprised only of digits.

FIG. 1 is an operational flow diagram illustrating a high-level overview of a method 100 for machine-learnt field-specific standardization. Raw values and corresponding standardized values are tokenized into raw token sequences and corresponding standardized token sequences, block 102. A system creates a training set for learning standardization. For example, and without limitation, this can include a machine-learning framework tokenizing raw values that include "(123)4567890" and their standardized values that include "123-456-7890" into raw token sequences that include "(, 123,), 456, 7890" and their aligned standardized token sequences that include "123, -, 456, -, 7890".

A raw value can be unprocessed characters. A standardized value can be normalized characters. Tokenizing can be the process of demarcating and possibly classifying sections of a string of input characters, such that the result can be passed on to some other form of processing. A raw token sequence can be an unprocessed collection of linguistic units in a particular order. A standardized token sequence can be a normalized collection of linguistic units in a particular order.

Tokenizing the raw values and the corresponding standardized values into the raw token sequences and the corresponding standardized token sequences may include aligning the raw token sequences with the corresponding standardized token sequences. For example, the machine-learning framework aligns the raw token sequence "(, 123,), 456, 7890" and the standardized token sequences "123, -, 456, -, 7890" as "(, 123,), 456, 7890" and

"123, -, 456, -, 7890"

Aligning can be putting things into appropriate relative positions.

After a training set is created, a machine-learning model learns standardization from token insertions and token substitutions that modify raw token sequences to match their standardized token sequences, block 104. A machine-learning model learns standardization from a training set. By way of example and without limitation, this can include a machine-learning model learning standardization, which includes the insertion of hyphen tokens and the substitution of nil tokens for parentheses tokens that modifies the raw token sequence "(, 123,), 456, 7890" to match the standardized token sequence "123, -, 456, -, 7890".

A machine-learning model can be a computer system that scientifically studies algorithms and/or statistical models to perform a specific task effectively by relying on patterns and inference instead of using explicit instructions. Standardization can be the process of making something conform to a norm. A token insertion can be the placement of a linguistic unit into a sequence of linguistic units. A token substitution can be the replacement of a linguistic unit in a sequence of linguistic units by another linguistic unit. Matching can be corresponding or causing to correspond in some essential respect.

Following the machine-learning model learning standardization from a training set, at least one input value is optionally received, block 106. The customer resolution engine receives values to be standardized. In embodiments, this can include the customer resolution engine receiving input values that include "(987)6543210". An input value can be characters that are fed into a computer program.

Subsequent to the machine-learning model learning standardization from a training set, an input value is tokenized into an input token sequence, block 108. The customer resolution engine tokenizes values that will be standardized. For example, and without limitation, this can include the customer resolution engine tokenizing input values that include "(987)6543210" into an input token sequence that includes "(, 987,), 654, 3210". An input token sequence can be a collection of linguistic units in a particular order that are fed into a computer program.

After tokenizing an input value into an input token sequence, the machine-learning model determines a probability of inserting an insertion token after an insertion markable token in the input token sequence, block 110. The machine-learning model calculates the probabilities of inserting various tokens in various locations in an input token sequence. By way of example and without limitation, this can include the machine-learning model calculating a 99% probability that hyphen tokens should be inserted after the third digit token and the sixth digit token in "(, 987,), 654, 3210". A probability can be the likelihood of something being the case. An insertion token can be a linguistic unit that can be placed into a sequence of linguistic units. An insertion markable token can be a linguistic unit that identifies where another linguistic unit may be placed.

Determining the probability of inserting the insertion token after the insertion markable token in the input token sequence may be based on a count of instances that the insertion token is inserted after a class of the insertion markable token in any raw token sequence and a count of instances that any raw token sequence includes the class of the insertion markable token. For example, the machine-learning model counts 198 instances in the training set that hyphens are inserted after 3 digit tokens and 200 instances of 3 digit tokens in the training set, and then divides 198 by 200 to result in the 99% probability that hyphens should be inserted after 3 digit tokens in the input token sequence. A count can be a total number of items. An instance can be an occurrence of something. A class can be a category of things having some property or attribute in common and differentiated from other things by kind, type, or quality.

Following the calculation of the probability of inserting an insertion token, a determination is made whether the probability of inserting the insertion token satisfies a threshold, block 112. The customer resolution engine determines whether to insert any tokens. In embodiments, this can include the customer resolution engine determining whether the 99% probability of inserting these hyphen tokens is greater than the 50% insertion threshold. A threshold can be the magnitude that must be met for a certain result to occur. If the probability of inserting the insertion token satisfies the threshold, the method 100 continues to block 114 to insert the insertion token after the insertion markable token in the input token sequence. If the probability of inserting the insertion token does not satisfy the threshold, the method 100 proceeds to block 116 to determine whether to replace any tokens in the input token sequence.

If the probability of inserting the insertion token satisfies the threshold, the insertion token is inserted after the insertion markable token in the input token sequence, block 114. The customer resolution engine inserts tokens in the input token sequence. For example, and without limitation, this can include the customer resolution engine inserting the hyphen tokens after the third digit token and the sixth digit token to modify the input token sequence to include "(, 987, -,), 654, -, 3210", since the 99% probability that these hyphen tokens should be inserted is greater than the 50% insertion threshold.

Having calculated the probability of inserting tokens, the machine-learning model determines a probability of substituting a substitution token for a substitutable token in the input token sequence, block 116. The machine-learning model calculates the probabilities for replacing tokens in an input token sequence. By way of example and without limitation, this can include the machine-learning model calculating a 98% probability that nil tokens should be inserted for the parentheses tokens in the input token sequence which includes "(, 987, -,), 654, -, 3210". A substitution token can be a linguistic unit that may replace another linguistic unit in a sequence of linguistic units. A substitutable token can be a linguistic unit which is in a sequence of linguistic units and which may be replaced by another linguistic unit.

Determining the probability of substituting the substitution token for the substitutable token in the input token sequence my be based on a count of instances that the substitution token is substituted for a class of the substitutable token in any raw token sequence and a count of instances that any raw token sequence includes the class of the substitutable token. For example, the machine-learning model counts 49 instances in the training set that parentheses are deleted and 50 instances of parentheses in the training set, and then divides 49 by 50 to result in the 98% probability that parentheses should be deleted in the input token sequence.

After calculating the probability of substituting a substitution token for a substitutable token in the input token sequence, a determination is made whether the probability of substituting the substitution token satisfies another threshold, block 118. The customer resolution engine determines whether to replace any tokens in the input token sequence. In embodiments, this can include the customer resolution engine determining whether the 98% probability that nil tokens should be substituted for the parentheses tokens is greater than the 49% substitution threshold. Although these examples describe an insertion threshold of 50% and a substitution threshold of 49%, these thresholds may be any values, including the same value. If the probability of substituting a substitution token satisfies the other threshold, the method 100 continues to block 120 to substitute the substitution token for a substitutable token in the input token sequence. If the probability of substituting a substitution token does not satisfy the other threshold, the method 100 proceeds to block 122 to possibly rearrange and/or join the input token sequence.

If the probability of substituting the substitution token satisfies the other threshold, the substitution token is substituted for the substitutable token in the input token sequence, block 120. The customer resolution engine replaces tokens in the input token sequence. For example, and without limitation, this can include the customer resolution engine substituting nil tokens for the parentheses tokens to modify the input token sequence to include "987, -, 654, -, 3210", because the 98% probability of substituting nil tokens for the parentheses tokens is greater than the 49% substitution threshold.

Following the possible insertions and replacement of tokens in an input token sequence, tokens are optionally rearranged in the input token sequence, block 122. The customer resolution engine rearranges tokens in the input token sequence as necessary. In embodiments, this can include the customer resolution engine rearranging the input token sequence rue "6, Rue, du, Cornet" to become "Rue, du, Cornet, 6" because the street number is listed after the street name in locales such as Belgium.

Having possibly inserted and replaced tokens in an input token sequence, tokens are optionally joined in the input token sequence, block 124. The customer resolution engine joins tokens in the input token sequence as necessary. In embodiments, this can include the customer resolution engine joining the input token sequence "987, -, 654, -, 3210", to create "987-654-3210", which is standardized version of the US phone number fields in a master profile. In another example, customer resolution engine joins the input token sequence "Rue, du, Cornet, 6," to create "Rue du Cornet 6," which is the standardized version of the Belgian street address fields in a master profile.

The method 100 may be repeated as desired. Although this disclosure describes the blocks 102-124 executing in a particular order, the blocks 102-124 may be executed in a different order. In other implementations, each of the blocks 102-124 may also be executed in combination with other blocks and/or some blocks may be divided into a different set of blocks.

System Overview

Figure 2:
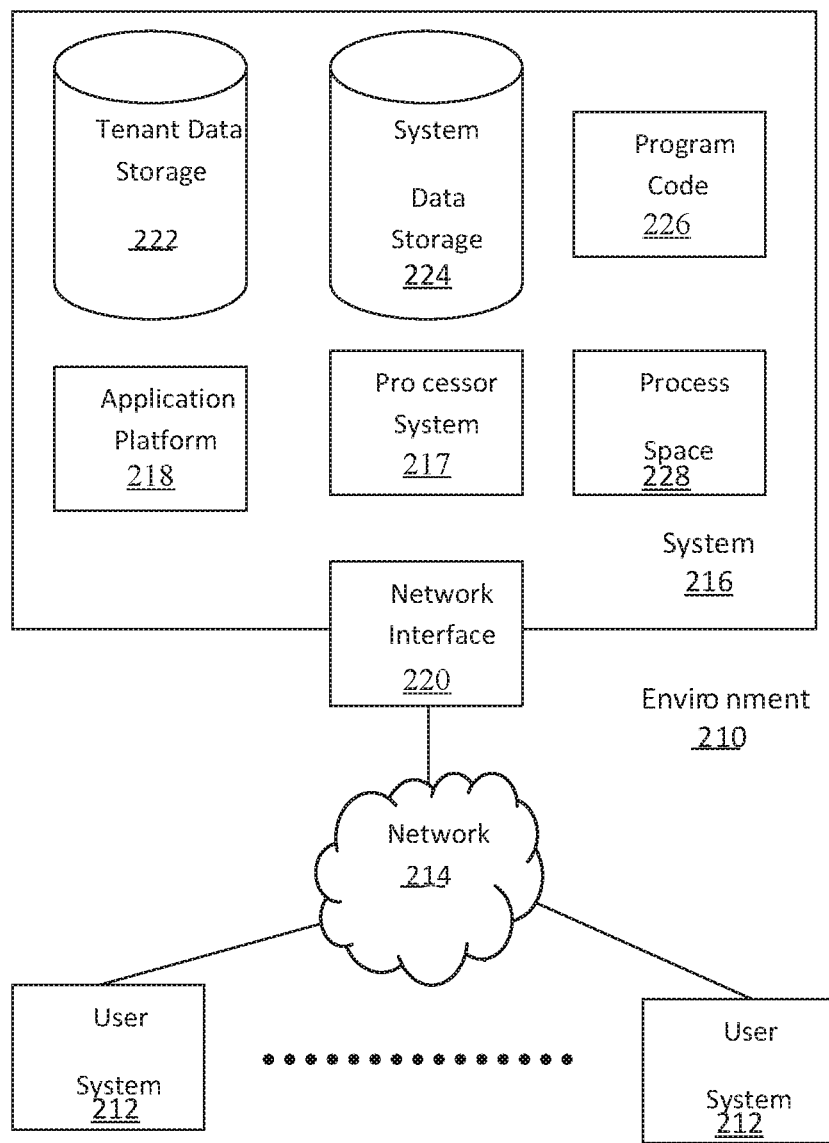
FIG. 2 illustrates a block diagram of an example of an environment wherein an on-demand database service might be used.

FIG. 2 illustrates a block diagram of an environment 210 wherein an on-demand database service might be used. The environment 210 may include user systems 212, a network 214, a system 216, a processor system 217, an application platform 218, a network interface 220, a tenant data storage 222, a system data storage 224, program code 226, and a process space 228. In other embodiments, the environment 210 may not have all of the components listed and/or may have other elements instead of, or in addition to, those listed above.

The environment 210 is an environment in which an on-demand database service exists. A user system 212 may be any machine or system that is used by a user to access a database user system. For example, any of the user systems 212 may be a handheld computing device, a mobile phone, a laptop computer, a workstation, and/or a network of computing devices. As illustrated in FIG. 2 (and in more detail in FIG. 4) the user systems 212 might interact via the network 214 with an on-demand database service, which is the system 216.

An on-demand database service, such as the system 216, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, the "on-demand database service 216" and the "system 216" will be used interchangeably herein. A database image may include one or more database objects. A relational database management system (RDMS) or the equivalent may execute storage and retrieval of information against the database object(s). The application platform 218 may be a framework that allows the applications of the system 216 to run, such as the hardware and/or software, e.g., the operating system. In an embodiment, the on-demand database service 216 may include the application platform 218 which enables creation, managing and executing one or more applications developed by the provider of the on-demand database service, users accessing the on-demand database service via user systems 212, or third-party application developers accessing the on-demand database service via the user systems 212.

The users of the user systems 212 may differ in their respective capacities, and the capacity of a particular user system 212 might be entirely determined by permissions (permission levels) for the current user. For example, where a salesperson is using a particular user system 212 to interact with the system 216, that user system 212 has the capacities allotted to that salesperson. However, while an administrator is using that user system 212 to interact with the system 216, that user system 212 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 214 is any network or combination of networks of devices that communicate with one another. For example, the network 214 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

The user systems 212 might communicate with the system 216 using TCP/IP and, at a higher network level, use other common Internet protocols to communicate, such as HTTP, FTP, AFS, WAP, etc. In an example where HTTP is used, the user systems 212 might include an HTTP client commonly referred to as a "browser" for sending and receiving HTTP messages to and from an HTTP server at the system 216. Such an HTTP server might be implemented as the sole network interface between the system 216 and the network 214, but other techniques might be used as well or instead. In some implementations, the interface between the system 216 and the network 214 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, the system 216, shown in FIG. 2, implements a web-based customer relationship management (CRM) system. For example, in one embodiment, the system 216 includes application servers configured to implement and execute CRM software applications as well as provide related data, code, forms, webpages and other information to and from the user systems 212 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, the system 216 implements applications other than, or in addition to, a CRM application. For example, the system 216 may provide tenant access to multiple hosted (standard and custom) applications, including a CRM application. User (or third-party developer) applications, which may or may not include CRM, may be supported by the application platform 218, which manages creation, storage of the applications into one or more database objects and executing of the applications in a virtual machine in the process space of the system 216.

One arrangement for elements of the system 216 is shown in FIG. 2, including the network interface 220, the application platform 218, the tenant data storage 222 for tenant data 223, the system data storage 224 for system data 225 accessible to the system 216 and possibly multiple tenants, the program code 226 for implementing various functions of the system 216, and the process space 228 for executing MTS system processes and tenant-specific processes, such as running applications as part of an application hosting service. Additional processes that may execute on the system 216 include database indexing processes.

Several elements in the system shown in FIG. 2 include conventional, well-known elements that are explained only briefly here. For example, each of the user systems 212 could include a desktop personal computer, workstation, laptop, PDA, cell phone, or any wireless access protocol (WAP) enabled device or any other computing device capable of interfacing directly or indirectly to the Internet or other network connection. Each of the user systems 212 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of the user systems 212 to access, process and view information, pages and applications available to it from the system 216 over the network 214. Each of the user systems 212 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by the system 216 or other systems or servers. For example, the user interface device may be used to access data and applications hosted by the system 216, and to perform searches on stored data, and otherwise allow a user to interact with various GUI pages that may be presented to a user. As discussed above, embodiments are suitable for use with the Internet, which refers to a specific global internetwork of networks. However, it should be understood that other networks may be used instead of the Internet, such as an intranet, an extranet, a virtual private network (VPN), a non-TCP/IP based network, any LAN or WAN or the like.

According to one embodiment, each of the user systems 212 and all of its components are operator configurable using applications, such as a browser, including computer code run using a central processing unit such as an Intel Pentium® processor or the like. Similarly, the system 216 (and additional instances of an MTS, where more than one is present) and all of their components might be operator configurable using application(s) including computer code to run using a central processing unit such as the processor system 217, which may include an Intel Pentium® processor or the like, and/or multiple processor units. A computer program product embodiment includes a machine-readable storage medium (media) having instructions stored thereon/in which may be used to program a computer to perform any of the processes of the embodiments described herein. Computer code for operating and configuring the system 216 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments may be implemented in any programming language that may be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, the system 216 is configured to provide webpages, forms, applications, data and media content to the user (client) systems 212 to support the access by the user systems 212 as tenants of the system 216. As such, the system 216 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein may be implemented as single databases, a distributed database, a collection of distributed databases, a database with redundant online or offline back-ups or other redundancies, etc., and might include a distributed database or storage network and associated processing intelligence.

Figure 3:
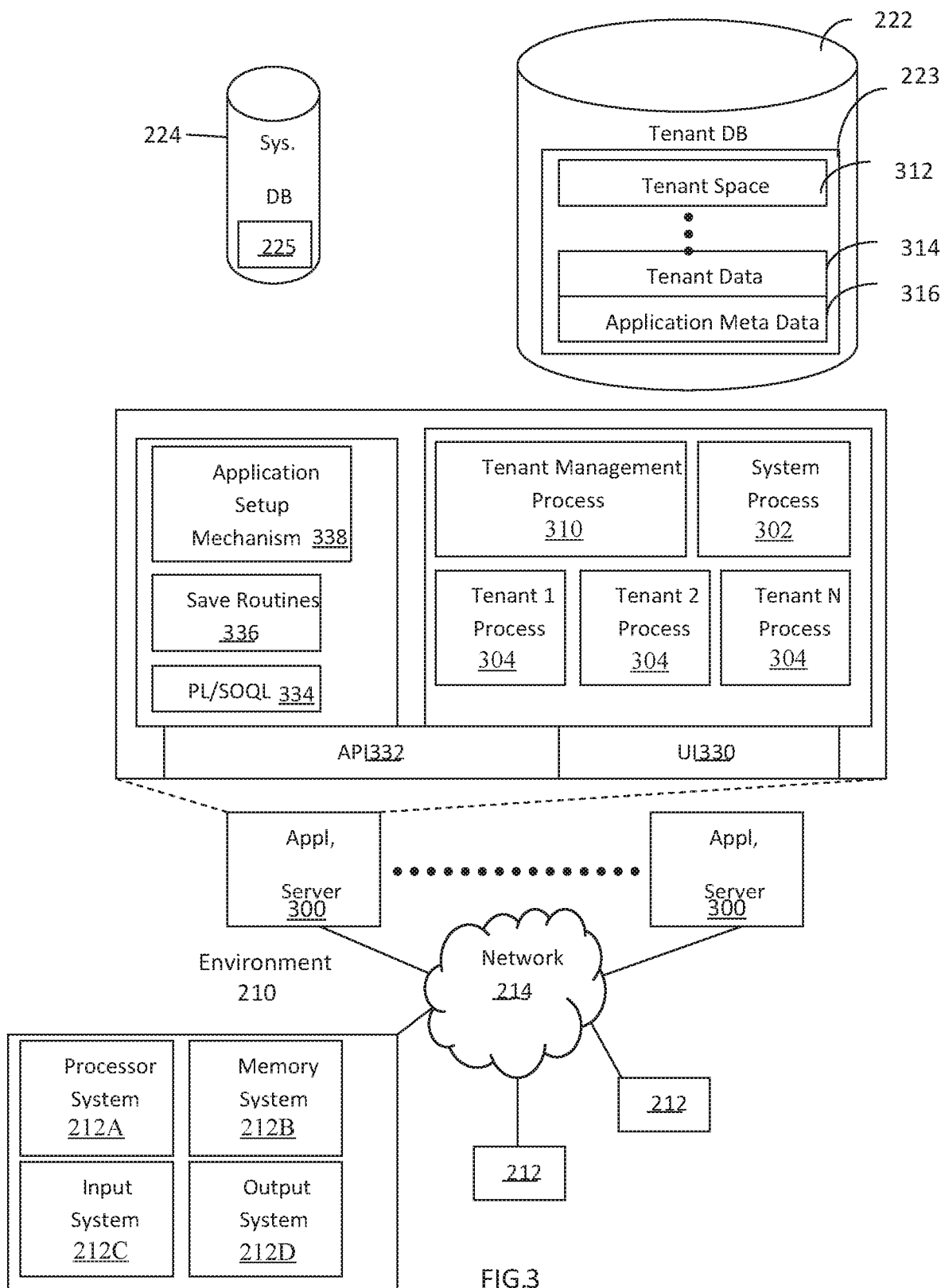
FIG. 3 illustrates a block diagram of an embodiment of elements of FIG. 2 and various possible interconnections between these elements.

FIG. 3 also illustrates the environment 210. However, in FIG. 3 elements of the system 216 and various interconnections in an embodiment are further illustrated. FIG. 3 shows that the each of the user systems 212 may include a processor system 212A, a memory system 212B, an input system 212C, and an output system 212D. FIG. 3 shows the network 214 and the system 216. FIG. 3 also shows that the system 216 may include the tenant data storage 222, the tenant data 223, the system data storage 224, the system data 225, a User Interface (UI) 330, an Application Program Interface (API) 332, a PL/SOQL 334, save routines 336, an application setup mechanism 338, applications servers $300_1$-$300_N$, a system process space 302, tenant process spaces 304, a tenant management process space 310, a tenant storage area 312, a user storage 314, and application metadata 316. In other embodiments, the environment 210 may not have the same elements as those listed above and/or may have other elements instead of, or in addition to, those listed above.

The user systems 212, the network 214, the system 216, the tenant data storage 222, and the system data storage 224 were discussed above in FIG. 2. Regarding the user systems 212, the processor system 212A may be any combination of one or more processors. The memory system 212B may be any combination of one or more memory devices, short term, and/or long-term memory. The input system 212C may be any combination of input devices, such as one or more keyboards, mice, trackballs, scanners, cameras, and/or interfaces to networks. The output system 212D may be any combination of output devices, such as one or more monitors, printers, and/or interfaces to networks. As shown by FIG. 3, the system 216 may include the network interface 220 (of FIG. 2) implemented as a set of HTTP application servers 300, the application platform 218, the tenant data storage 222, and the system data storage 224. Also shown is the system process space 302, including individual tenant process spaces 304 and the tenant management process space 310. Each application server 300 may be configured to access tenant data storage 222 and the tenant data 223 therein, and the system data storage 224 and the system data 225 therein to serve requests of the user systems 212. The tenant data 223 might be divided into individual tenant storage areas 312, which may be either a physical arrangement and/or a logical arrangement of data. Within each tenant storage area 312, the user storage 314 and the application metadata 316 might be similarly allocated for each user. For example, a copy of a user's most recently used (MRU) items might be stored to the user storage 314. Similarly, a copy of MRU items for an entire organization that is a tenant might be stored to the tenant storage area 312. The UI 330 provides a user interface and the API 332 provides an application programmer interface to the system 216 resident processes to users and/or developers at the user systems 212. The tenant data and the system data may be stored in various databases, such as one or more Oracle™ databases.

The application platform 218 includes the application setup mechanism 338 that supports application developers' creation and management of applications, which may be saved as metadata into the tenant data storage 222 by the save routines 336 for execution by subscribers as one or more tenant process spaces 304 managed by the tenant management process 310 for example. Invocations to such applications may be coded using the PL/SOQL 334 that provides a programming language style interface extension to the API 332. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving the application metadata 316 for the subscriber making the invocation and executing the metadata as an application in a virtual machine.

Each application server 300 may be communicably coupled to database systems, e.g., having access to the system data 225 and the tenant data 223, via a different network connection. For example, one application server $300_1$ might be coupled via the network 214 (e.g., the Internet), another application server $300_{N-1}$ might be coupled via a direct network link, and another application server $300_N$ might be coupled by yet a different network connection. Transfer Control Protocol and Internet Protocol (TCP/IP) are typical protocols for communicating between application servers 300 and the database system. However, it will be apparent to one skilled in the art that other transport protocols may be used to optimize the system depending on the network interconnect used.

In certain embodiments, each application server 300 is configured to handle requests for any user associated with any organization that is a tenant. Because it is desirable to be able to add and remove application servers from the server pool at any time for any reason, there is preferably no server affinity for a user and/or organization to a specific application server 300. In one embodiment, therefore, an interface system implementing a load balancing function (e.g., an F5 Big-IP load balancer) is communicably coupled between the application servers 300 and the user systems 212 to distribute requests to the application servers 300. In one embodiment, the load balancer uses a least connections algorithm to route user requests to the application servers 300. Other examples of load balancing algorithms, such as round robin and observed response time, also may be used. For example, in certain embodiments, three consecutive requests from the same user could hit three different application servers 300, and three requests from different users could hit the same application server 300. In this manner, the system 216 is multi-tenant, wherein the system 216 handles storage of, and access to, different objects, data and applications across disparate users and organizations.

As an example of storage, one tenant might be a company that employs a sales force where each salesperson uses the system 216 to manage their sales process. Thus, a user might maintain contact data, leads data, customer follow-up data, performance data, goals and progress data, etc., all applicable to that user's personal sales process (e.g., in the tenant data storage 222). In an example of a MTS arrangement, since all of the data and the applications to access, view, modify, report, transmit, calculate, etc., may be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 216 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, the system 216 might also maintain system level data usable by multiple tenants or other data. Such system level data might include industry reports, news, postings, and the like that are sharable among tenants.

In certain embodiments, the user systems 212 (which may be client systems) communicate with the application servers 300 to request and update system-level and tenant-level data from the system 216 that may require sending one or more queries to the tenant data storage 222 and/or the system data storage 224. The system 216 (e.g., an application server 300 in the system 216) automatically generates one or more SQL statements (e.g., one or more SQL queries) that are designed to access the desired information. The system data storage 224 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A system for machine-learnt field-specific standardization, the system comprising:
    one or more processors; and
    a non-transitory computer readable medium storing a plurality of instructions, which when executed, cause the one or more processors to:
    train a machine-learning model to tokenize raw values and corresponding standardized values into raw token sequences and corresponding standardized token sequences;
    train the machine-learning model to learn standardization of each one of a plurality of specific data fields from token insertions and token substitutions that modify the raw token sequences to match the corresponding standardized token sequences;
    tokenize an input value into an input token sequence;
    determine, by the machine-learning model, a probability of inserting an insertion token after an insertion markable token in the input token sequence, based on learning a standardization of one of the plurality of specific data fields which comprises inserting the insertion token after a class of the insertion markable token in the raw token sequences;
    determine whether the probability of inserting the insertion token exceeds a threshold;
    insert the insertion token, which is punctuation inserted after the insertion markable token in the input token sequence, in response to a determination that the probability of inserting the insertion token exceeds the threshold;
    determine, by the machine-learning model, a probability of substituting a substitution token, for a substitutable token that differs in location from the insertion markable token, in the input token sequence, based on learning a standardization of one of the plurality of specific data fields which comprises substituting the substitution token for a class of the substitutable token in the raw token sequences;
    determine whether the probability of substituting the substitution token exceeds another threshold; and
    substitute the substitution token, which is one of a nil character, a letter that is part of a word, or a digit that is part of a number, for the substitutable token in the input token sequence, in response to a determination that the probability of substituting the substitution token exceeds the other threshold.

2. The system of claim 1, wherein the plurality of instructions, when executed, will further cause the one or more processors to receive at least one input value.

3. The system of claim 1, wherein tokenizing the raw values and the corresponding standardized values into the raw token sequences and the corresponding standardized token sequences comprises aligning the raw token sequences with the corresponding standardized token sequences.

4. The system of claim 1, wherein determining the probability of inserting the insertion token after the insertion markable token in the input token sequence is based on a count of instances that the insertion token is inserted after the class of the insertion markable token in any raw token sequence and a count of instances that any raw token sequence includes the class of the insertion markable token.

5. The system of claim 1, wherein determining the probability of substituting the substitution token for the substitutable token in the input token sequence is based on a count of instances that the substitution token is substituted for a class of the substitutable token in any raw token sequence and a count of instances that any raw token sequence includes the class of the substitutable token.

6. The system of claim 1, wherein the plurality of instructions, when executed, will further cause the one or more processors to rearrange tokens in the input token sequence.

7. The system of claim 1, wherein the plurality of instructions, when executed, will further cause the one or more processors to join tokens in the input token sequence.

8. A computer program product comprising computer-readable program code to be executed by one or more processors when retrieved from a non-transitory computer-readable medium, the program code including instructions to:
  train a machine-learning model to tokenize raw values and corresponding standardized values into raw token sequences and corresponding standardized token sequences;
  train the machine-learning model to learn standardization of each one of a plurality of specific data fields from token insertions and token substitutions that modify the raw token sequences to match the corresponding standardized token sequences;
  tokenize an input value into an input token sequence;
  determine, by the machine-learning model, a probability of inserting an insertion token after an insertion markable token in the input sequence, based on learning a standardization of one of the plurality of specific data fields which comprises inserting the insertion token after a class of the insertion markable token in the raw token sequences;
  determine whether the probability of inserting the insertion token exceeds a threshold;
  insert the insertion token, which is punctuation inserted after the insertion markable token in the input token sequence, in response to a determination that the probability of inserting the insertion token exceeds the threshold;
  determine, by the machine-learning model, a probability of substituting a substitution token, for a substitutable token that differs in location from the insertion markable token, in the input token sequence, based on learning a standardization of one of the plurality of specific data fields which comprises substituting the substitution token for a class of the substitutable token in the raw token sequences;
  determine whether the probability of substituting the substitution token exceeds another threshold; and
  substitute the substitution token, which is one of a nil character, a letter that is part of a word, or a digit that is part of a number, for the substitutable token in the input token sequence, in response to a determination that the probability of substituting the substitution token exceeds the other threshold.

9. The computer program product of claim 8, wherein the program code further includes instructions to receive at least one input value.

10. The computer program product of claim 8, wherein tokenizing the raw values and the corresponding standardized values into the raw token sequences and the corresponding standardized token sequences comprises aligning the raw token sequences with the corresponding standardized token sequences.

11. The computer program product of claim 8, wherein determining the probability of inserting the insertion token after the insertion markable token in the input token sequence is based on a count of instances that the insertion token is inserted after a class of the insertion markable token in any raw token sequence and a count of instances that any raw token sequence includes the class of the insertion markable token.

12. The computer program product of claim 8, wherein determining the probability of substituting the substitution token for the substitutable token in the input token sequence is based on a count of instances that the substitution token is substituted for a class of the substitutable token in any raw token sequence and a count of instances that any raw token sequence includes the class of the substitutable token.

13. The computer program product of claim 8, wherein the program code further includes instructions to rearrange tokens in the input token sequence.

14. The computer program product of claim 8, wherein the program code further includes instructions to join tokens in the input token sequence.

15. A method for machine-learnt field-specific standardization, the method comprising:
  training a machine-learning model to tokenize raw values and corresponding standardized values into raw token sequences and corresponding standardized token sequences;
  training the machine-learning model to learn standardization of each one of a plurality of specific data fields from token insertions and token substitutions that modify the raw token sequences to match the corresponding standardized token sequences;
  tokenizing an input value into an input token sequence;
  determining, by the machine-learning model, a probability of inserting an insertion token after an insertion markable token in the input token sequence, based on learning a standardization of one of the plurality of specific data fields which comprises inserting the insertion token after a class of the insertion markable token in the raw token sequences;
  determining whether the probability of inserting the insertion token exceeds a threshold;
  inserting the insertion token, which is punctuation inserted after the insertion markable token in the input token sequence, in response to a determination that the probability of inserting the insertion token exceeds the threshold;
  determining, by the machine-learning model, a probability of substituting a substitution token, for a substitutable token that differs in location from the insertion markable token, in the input token sequence, based on learning a standardization of one of the plurality of specific data fields which comprises substituting the substitution token for a class of the substitutable token in the raw token sequences;
  determining whether the probability of substituting the substitution token exceeds another threshold; and
  substituting the substitution token, which is one of nil, a letter that is part of a word, or a digit that is part of a number, for the substitutable token in the input token sequence, in response to a determination that the probability of substituting the substitution token exceeds the other threshold.

16. The method of claim 15, wherein the method further comprises receiving at least one input value.

17. The method of claim 15, wherein tokenizing the raw values and the corresponding standardized values into the raw token sequences and the corresponding standardized token sequences comprises aligning the raw token sequences with the corresponding standardized token sequences.

18. The method of claim 15, wherein determining the probability of inserting the insertion token after the insertion markable token in the input token sequence is based on a count of instances that the insertion token is inserted after a class of the insertion markable token in any raw token sequence and a count of instances that any raw token sequence includes the class of the insertion markable token.

19. The method of claim 15, wherein determining the probability of substituting the substitution token for the substitutable token in the input token sequence is based on a count of instances that the substitution token is substituted for a class of the substitutable token in any raw token sequence and a count of instances that any raw token sequence includes the class of the substitutable token.

20. The method of claim 15, wherein the method further comprises
- rearranging tokens in the input token sequence; and
- joining tokens in the input token sequence.

* * * * *